(12) United States Patent
Fuhry et al.

(10) Patent No.: US 8,255,418 B2
(45) Date of Patent: Aug. 28, 2012

(54) NETWORKED COMPUTER SYSTEM PROVIDING AN INTEGRATED SUITE OF WEB SERVICES AND A GEOGRAPHIC INFORMATION SYSTEM (GIS) FOR REAL PROPERTY AND LAND PARCELS

(75) Inventors: David Patrick Fuhry, Parkman, OH (US); Joseph Walter Harwood, Stow, OH (US); Robert James McGee, Strongsville, OH (US); Allison McDaniel Schuring, Canton, OH (US)

(73) Assignee: Real Estate Portal USA, LLC, Cleveland, OH (US)

( * ) Notice: Subject to any disclaimer, the term of this patent is extended or adjusted under 35 U.S.C. 154(b) by 297 days.

(21) Appl. No.: 12/772,587

(22) Filed: May 3, 2010

(65) Prior Publication Data

US 2010/0287199 A1    Nov. 11, 2010

Related U.S. Application Data

(60) Provisional application No. 61/175,661, filed on May 5, 2009.

(51) Int. Cl.
*G06F 17/30* (2006.01)
*G06Q 50/00* (2012.01)
(52) U.S. Cl. ........ 707/770; 707/756; 707/802; 705/313; 709/203

(58) Field of Classification Search .................. 707/756, 707/770, 802; 705/313; 709/203
See application file for complete search history.

(56) References Cited

U.S. PATENT DOCUMENTS

| | | | |
|---|---|---|---|
| 5,471,392 A | 11/1995 | Yamashita | |
| 5,963,956 A | 10/1999 | Smartt | |
| 6,035,299 A | 3/2000 | White et al. | |
| 6,141,454 A | 10/2000 | Seymour et al. | |
| 6,263,343 B1 | 7/2001 | Hirono | |
| 6,308,177 B1 | 10/2001 | Israni et al. | |
| 6,591,270 B1 | 7/2003 | White | |
| 7,092,957 B2 | 8/2006 | Klein | |
| 7,164,988 B2 | 1/2007 | Kato | |
| 7,383,125 B2 | 6/2008 | de Silva et al. | |
| 7,890,509 B1 * | 2/2011 | Pearcy et al. | 707/736 |
| 8,065,352 B2 * | 11/2011 | Klein | 707/920 |
| 2006/0200492 A1 * | 9/2006 | Villena et al. | 707/104.1 |
| 2007/0198466 A1 * | 8/2007 | Sullivan et al. | 707/1 |
| 2009/0144097 A1 * | 6/2009 | Fassio et al. | 705/7 |
| 2011/0137811 A1 * | 6/2011 | Patel et al. | 705/313 |

* cited by examiner

*Primary Examiner* — Cheryl Lewis
(74) *Attorney, Agent, or Firm* — Hahn Loeser & Parks LLP

(57) ABSTRACT

Systems and methods to search for, gather, transform, integrate, and present information representative of real property and land parcels. The systems and methods are web-based and include a spatial database configuration having an input side and an output side. The input side is capable of transforming data gathered from multiple disparate sources in an automated or semi-automated manner. The output side is capable of presenting an intuitive interface for users to search for, access, and view the transformed information.

38 Claims, 12 Drawing Sheets

FIG. 3

Search Results Table

Results table from a basic search
1. Address Hyperlinks to map
2. Parcel hyperlinks "Outlinks" to county specific Auditor Record
3. Data Hyperlinks to Recorder/GIS Record, Tax Analyzer, and Auto-Comp tool
4. Map chooser lets you jump to a variety of map sources (Google Maps, Bing, Map-Quest)

FIG. 5

Results table export: from search table export format list and order form

NETWORKED COMPUTER SYSTEM PROVIDING AN INTEGRATED SUITE OF WEB SERVICES AND A GEOGRAPHIC INFORMATION SYSTEM (GIS) FOR REAL PROPERTY AND LAND PARCELS

This U.S. patent application claims the benefit of and priority to provisional U.S. Patent Application Ser. No. 61/175,661 filed on May 5, 2009, which is incorporated by reference herein in its entirety.

TECHNICAL FIELD

Certain embodiments of the present invention relate to real estate and related subject matter. More particularly, certain embodiments of the present invention relate to a web-based system and methods of searching for, gathering, transforming, integrating, and presenting information representative of real property and land parcels.

BACKGROUND

Information related to real estate is typically recorded and maintained at the county level of government in the United States. Therefore, each county within a state is responsible for maintaining real estate records with respect to, for example, sales, transactions, deeds, land surveys (property boundary information), liens, history, etc. This information is, at present, difficult to find, gather, sort through, analyze, and interpret for various uses. Furthermore, the level of difficulty and data formats can vary greatly from county to county.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

In general, embodiments of the present invention comprise systems and methods to search for, gather, transform, integrate, and present information representative of real property and land parcels. The embodiments are web-based and include a spatial database configuration having an input side and an output side. The input side is capable of transforming data gathered from multiple disparate sources in an automated or semi-automated manner. The output side is capable of presenting an intuitive interface for users to search for, access, and view the transformed information.

One embodiment of the present invention comprises a networked computer system to search for, gather, transform, integrate, and present information representative of real property and land parcels. The networked computer system includes a spatial database architecture of hardware and software configured and programmed to automatically import source information representative of real property and land parcels from a plurality of disparate data sources across a plurality of disparate counties, assessing authorities, taxing authorities, and mapping authorities and being in a plurality of disparate data formats. The spatial database architecture is further configured and programmed to automatically transform the source information from the plurality of disparate data formats having the source information to a standardized data format having normalized data, and automatically store the normalized data in the standardized data format. The spatial database architecture is also configured and programmed to perform a global search of the stored normalized data based on any of a plurality of predefined search parameters and combinations thereof to generate search results data. The plurality of predefined search parameters may include at least one of a parcel identification number, a deeded owner name, a land use code, a sale price, an address, a neighborhood code, a transfer date, a school district, a zip code, a municipality, a land value, an improvement value, a total market value, a building square-footage, and an acreage. The networked computer system further includes at least one web server operationally interfacing to the spatial database architecture. The web server is configured and programmed to provide access to and real-time interaction with the spatial database architecture by an end-user. Access to and real-time interaction with the spatial database architecture may be via at least one of a web site hosted on the web server and a web server application supported by the web server. The spatial database architecture may be further configured and programmed to export at least a portion of the search results data as selected by the end-user via the web server. The web server may be further configured and programmed to transform at least a portion of the search results data to map image data. The web server may be further configured and programmed to direct an end-user towards at least one external web site to access external data associated with the search results data. The external data may include county auditor/assessor data and/or county recorder data, for example. The spatial database architecture may be further configured and programmed to analyze and transform at least one of the search results data and the external data to form analysis results data. The spatial database architecture may be further configured and programmed to export at least a portion of the analysis results data as selected by the end-user via the web server. The analysis results data may include at least one of tax analysis data and comparable properties data, for example. The spatial database architecture and the web server may further be configured and programmed to direct an end-user towards at least one external map web site and to integrate at least a portion of the search results data with at least one map of the external map web site. The networked computer system may further include at least one end-user computer device operationally interfacing to at least one web server and configured and programmed to receive and display user interface screens, map image data, search results data, external data, and analysis results data.

Another embodiment of the present invention comprises a networked computer system to search for, gather, transform, integrate, and present information representative of real property and land parcels. The networked computer system includes means for automatically importing source information representative of real property and land parcels from a plurality of disparate data sources across a plurality of disparate counties, assessing authorities, taxing authorities, and mapping authorities and being in a plurality of disparate data formats. The networked computer system further includes means for automatically transforming the source information from the plurality of disparate data formats having the source information to a standardized data format having normalized data, and means for automatically storing the normalized data in the standardized data format. The networked computer system also includes means for performing a global search of the stored normalized data based on any of a plurality of predefined search parameters and combinations thereof to generate search results data. The plurality of predefined search parameters may include at least one of a parcel identification number, a deeded owner name, a land use code, a sale price, an address, a neighborhood code, a transfer date, a school district, a zip code, a municipality, a land value, an improvement value, a total market value, a building square-footage, and an acreage. The networked computer system may further include means for providing access to and real-time interaction with the means for performing a global search by an end-user. The networked computer system may also include means for transforming at least a portion of the search results data to map image data. The networked computer system may further include means for exporting at least a portion of the search results data as selected by an end-user. The networked computer system may also include means for directing an end-user towards at least one external web site to access external data associated with the search results data. The external data may include, for example, at least one of county auditor/assessor data and county recorder data. The networked computer system may further include means for analyzing and transforming at least one of the search results data and the external data to form analysis results data. The networked computer system may also include means for exporting at least a portion of the analysis results data as selected by an end-user. The analysis results data may include, for example, at least one of tax analysis data and comparable properties data. The networked computer system may further include means for directing an end-user towards at least one external map web site and integrating at least a portion of the search results data with at least one map of the external map web site. The networked computer system may also include means for displaying user interface screens, map image data, search results data, external data, and analysis results data.

A further embodiment of the present invention comprises a computerized method to search for, gather, transform, integrate, and present information representative of real property and land parcels. The method includes automatically importing source information representative of real property and land parcels from a plurality of disparate data sources across a plurality of disparate counties, assessing authorities, taxing authorities, and mapping authorities and being in a plurality of disparate data formats. The method further includes automatically transforming the source information from the plurality of disparate data formats having the source information to a standardized data format having normalized data, and automatically storing the normalized data in the standardized data format. The method also includes performing an end-user initiated global search of the stored normalized data based on any of a plurality of predefined search parameters and combinations thereof to generate search results data. The plurality of predefined search parameters may include at least one of a parcel identification number, a deeded owner name, a land use code, a sale price, an address, a neighborhood code, a transfer date, a school district, a zip code, a municipality, a land value, an improvement value, a total market value, a building square-footage, and an acreage. The method may further include transforming at least a portion of the search results data to map image data. The method may also include exporting at least a portion of the search results data as selected by an end-user. The method may further include directing an end-user towards at least one external web site to access external data associated with the search results data. The external data may include, for example, at least one of county auditor/assessor data and county recorder data. The method may also include analyzing and transforming at least one of the search results data and the external data to form analysis results data. The method may further include exporting at least a portion of the analysis results data as selected by an end-user. The analysis results data may include, for example, at least one of tax analysis data and comparable properties data. The method may also include directing an end-user towards at least one external map web site and integrating at least a portion of the search results data with at least one map of the external map web site. The method may further include displaying at least one of user interface screens, map image data, search results data, external data, and analysis results data.

These and other novel features of the subject matter of the present application, as well as details of illustrated embodiments thereof, will be more fully understood from the following description and drawings.

BRIEF DESCRIPTION OF THE DRAWINGS

FIG. 3 illustrates an example embodiment of a search results table showing search results for a search performed by an end-user using the search view of FIG. 2;

FIG. 5 illustrates an example embodiment of a screen shot of an end-user web page provided by a web site of the web servers of FIG. 1 showing a data export view;

DETAILED DESCRIPTION

Figure 1:
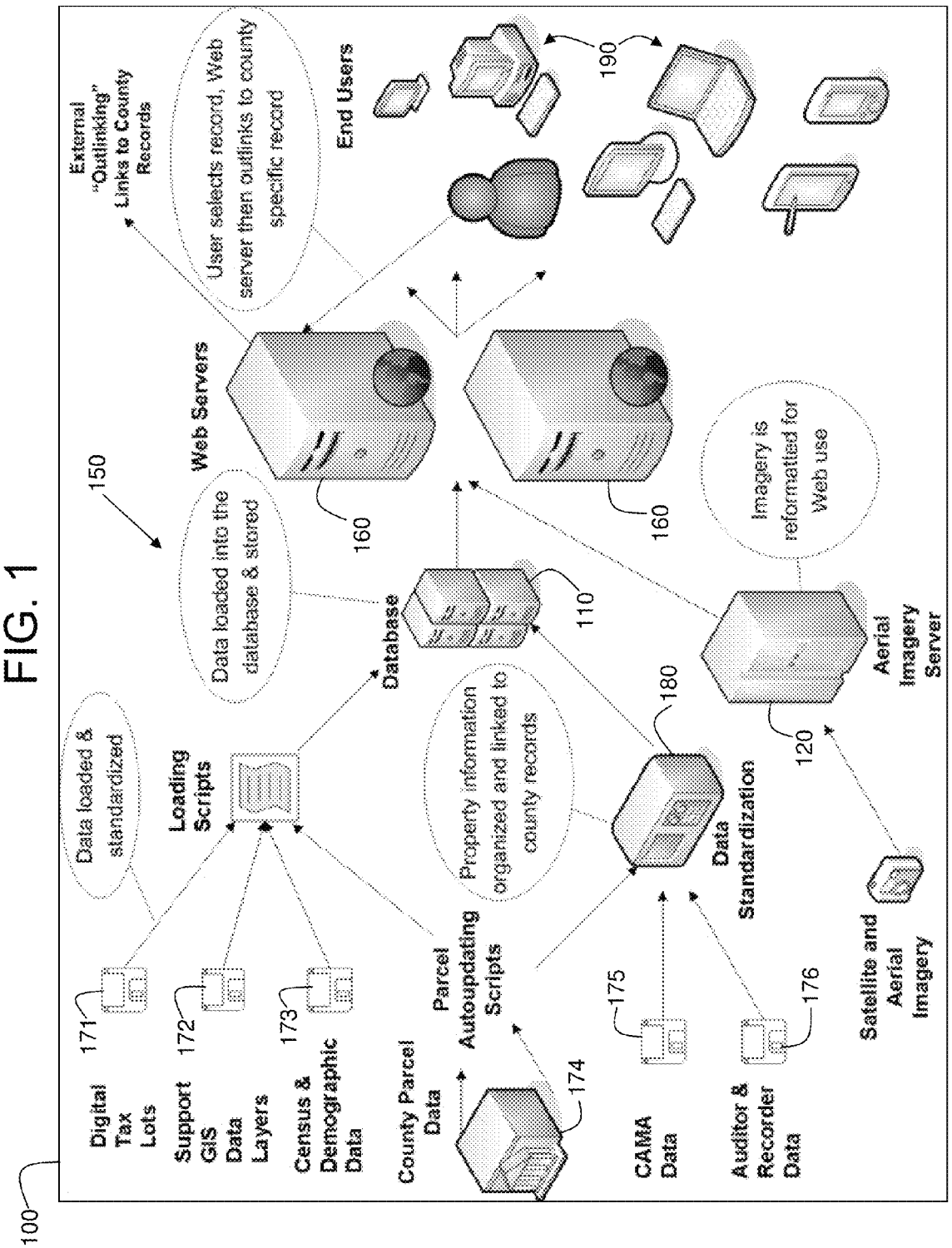
FIG. 1 illustrates an example embodiment of a networked computer system to search for, gather, transform, integrate, and present information representative of real property and land parcels.

FIG. 1 illustrates an example embodiment of a networked computer system 100 to search for, gather, transform, integrate, and present information representative of real property and land parcels. In general, the system 100 takes property boundary information and integrates it into a large database of spatial information while keeping demographic and attribute information attached to each property. The system gathers information from many counties, each county consisting of many properties, and loads the information into the system, extracts, transforms, and cleans the information, and extrapolates other information of interest from the basic property-related information. The process of collecting and integrating parcel data from multiple sources into a spatial database includes attribute normalization, updates, and maintenance.

The land and parcel spatial database of the system 100 is not confined by county boundaries or state boundaries. The entire global spatial database of the system 100 may be searched in multiple ways including by address, owner, parcel number, county, state, and zip code, for example, to populate a list of search results. The fundamental unit of the spatial database of the system 100 is a parcel. As used herein, the term "global search" refers to the ability to search the entire spatial database(s) of the system 100, independent of artificial boundaries such as counties or municipalities.

The system 100 supports end-user global queries such as by owner, address, and parcel lookup, as well as by more advanced searches on other attributes, and proximity queries. As the search region, a single county (or municipality or zip code) can be specified, or multiple counties, or an entire state, for example. A comparables search tool is provided which not only returns parcels comparable to a selected parcel, but also ranks results by similarity. A tax analysis tool is provided which not only returns parcels comparable to a selected parcel, but also ranks results by similarity to the selected parcel, summarizes tax valuation information of the top (most similar) results, and tells the user how the selected parcel's tax valuation compares with the results. The system 100 also provides a query builder for search on county-specific attributes, and aggregation of multiple queries, in accordance with an embodiment of the present invention. The system 100 provides appropriate simple, compound, fulltext, and spatial indexes over the data to support fast retrieval and analysis. The data and indexes are replicated across a cluster of nodes for performance and availability, in accordance with an embodiment of the present invention.

The spatial database of the system 100 supports direct SQL (structured query language) analytic queries. Spatial queries and operations are supported by an extended SQL dialect. Applications may access the spatial database via the standard ODBC (open database connectivity) and JDBC (JAVA database connectivity) interfaces. GIS (geographic information system) packages support direct connection to the spatial database through interoperability extensions. In accordance with an embodiment of the present invention, Open GIS Consortium (OGC) standard Web Map Service (WMS) and Web Feature Service (WFS) interfaces are provided.

Referring to FIG. 1, the system 100 includes at least one spatial database hosted on server machines 110, web servers 160, an aerial imagery server 120, a data standardization process module 180, and end-user computers and devices 190. Data that may be input into the system includes digital tax lots data 171, support GIS data layers 172, census and demographic data 173, county parcel data 174, CAMA (computer assisted mass appraisal) data 175, and auditor and recorder data 176. A geographic information system (GIS) integrates hardware, software, and data for capturing, managing, analyzing, and displaying all forms of geographically referenced information.

The system acts as a portal to gain access to a plurality of services and transmit information from several independent sources that can be, but are not always, related with respect to subject matter. The portal presents information from diverse and disparate sources in a unified, integrated manner.

The system 100 is configured to provide a view (e.g., a web page) of a web site showing a custom data site displaying additional map layers and data, a view of a web site showing a search table, and a view of a web site showing a search results table with multi-county results, in accordance with an embodiment of the present invention. The system 100 is configured to provide a search results table that maps links to outside mapping sites, in accordance with an embodiment of the present invention. The link status may automatically be checked to any data that is outlinked to. If a changed or broken link is detected, the link and associated automatic query method may be manually repaired or redirected. The links are not just a web URL (uniform resource locator), rather a table of web URLs in the spatial database with field names for cookies, intermediate character strings, and variable names for site types and behavior, and provide a method on which the link fills in search criteria and passes through to the destination in a seemingly one click operation.

The system 100 is further configured to provide a view of a web site showing a Google™ Maps link with parcel data displayed, a view of a web site showing a Google™ street view with parcel data displayed, and a view of a web site showing MS® Live maps with parcel data displayed, in accordance with an embodiment of the present invention. The system 100 is also configured to provide a view of a web site showing MS® Live Bird's Eye Maps with parcel data displayed, a view of a web site showing a results table with MS® Excel® export tool list active. The system 100 is further configured to provide an export of the results table which an end-user can analyze using a user's local spreadsheet software application (e.g., using an MS® Excel® spreadsheet), in accordance with an embodiment of the present invention.

The system 100 is further configured to provide a view of a web site showing a results table with GIS shapefile export tool list active. Also, the system 100 is configured to provide an exported search results parcel shapefile usable in GIS software such as ESRI's ArcMap™, in accordance with an embodiment of the present invention.

The networked computer system 100 includes a spatial database architecture 150 of hardware and software and at least one web server 160 operationally interfacing to the spatial database architecture 150. The web servers 160 are configured and programmed to provide access to and real-time interaction with the spatial database architecture 150 by an end-user via a web page. The web servers 160 and the spatial database architecture 150 may run on different server machines or on the same server machines, in accordance with various embodiments of the present invention. The web servers 160 perform any processing for satisfying a user request, including querying the spatial database(s) of the spatial database architecture 150 in a real time manner, obtaining local data from local files or external data from remote web services (e.g., via outlinking to county records), and performing transformations of the results of the aforementioned operations into a response for the user.

In accordance with an embodiment of the present invention, the spatial database architecture 150 includes a spatial database(s) operating on a heterogeneous cluster of server machines 110. Alternatively, the spatial database architecture may be implemented as a cloud computer model where the cluster may be located in an offsite data center, remote from the web servers 160. The hardware and software of the spatial database architecture 150 is configured and programmed to automatically import map source information 171-173 and non-map source information 174-176 representative of real property and land parcels from a plurality of disparate data sources across a plurality of disparate counties, assessing authorities, taxing authorities, and mapping authorities where the source information is in a plurality of disparate data formats. The non-map source information 174-176 may include auditor and recorder data, CAMA data, and county parcel data, whereas the map source information may include census and demographic data, support GIS data layers, and digital tax lots data, in accordance with an embodiment of the present invention.

The hardware and software of the spatial database architecture is further configured and programmed to automatically transform the non-map source information 174-176, via a data standardization process 180, from the plurality of disparate data formats having the source information to a standardized data format having normalized data, and automatically store the normalized data in the standardized data format. The hardware and software of the spatial database architecture is also configured and programmed to perform a global search of the stored normalized data based on any of a plurality of predefined search parameters and combinations thereof to generate search results data.

The data normalization or standardization process 180 is part of a load process that takes place on the cluster 110, in accordance with an embodiment of the present invention. The more computationally intensive parts of the data standardization process 180 are broken up and distributed amongst the various machines of the cluster 110 and reassembled. Much of the load process involves interacting with the spatial database(s) to import and transform data.

In accordance with an embodiment of the present invention, various web requests are handled by a machine in the cluster 110 receiving a request from a user via at least one end-user computer device 190. When computing a response, one or more requests to the spatial database are often made to answer a data-related question for the end-user. Many (but not all) spatial data in the system 100 is replicated (i.e., copied) to each machine in the cluster 110 in what is known as a shared-nothing database approach. It is typically fastest for a machine to query its own (local) spatial database to generate a response to a request. If the spatial data is not available locally, the machine may query the spatial database(s) of other machines to retrieve the data. In a more extreme case, where large amounts of computations may be required to satisfy a request, the responding machine may break the request into several pieces, distribute the pieces among the individual spatial databases on other machines, and reassemble the response.

Figure 2:
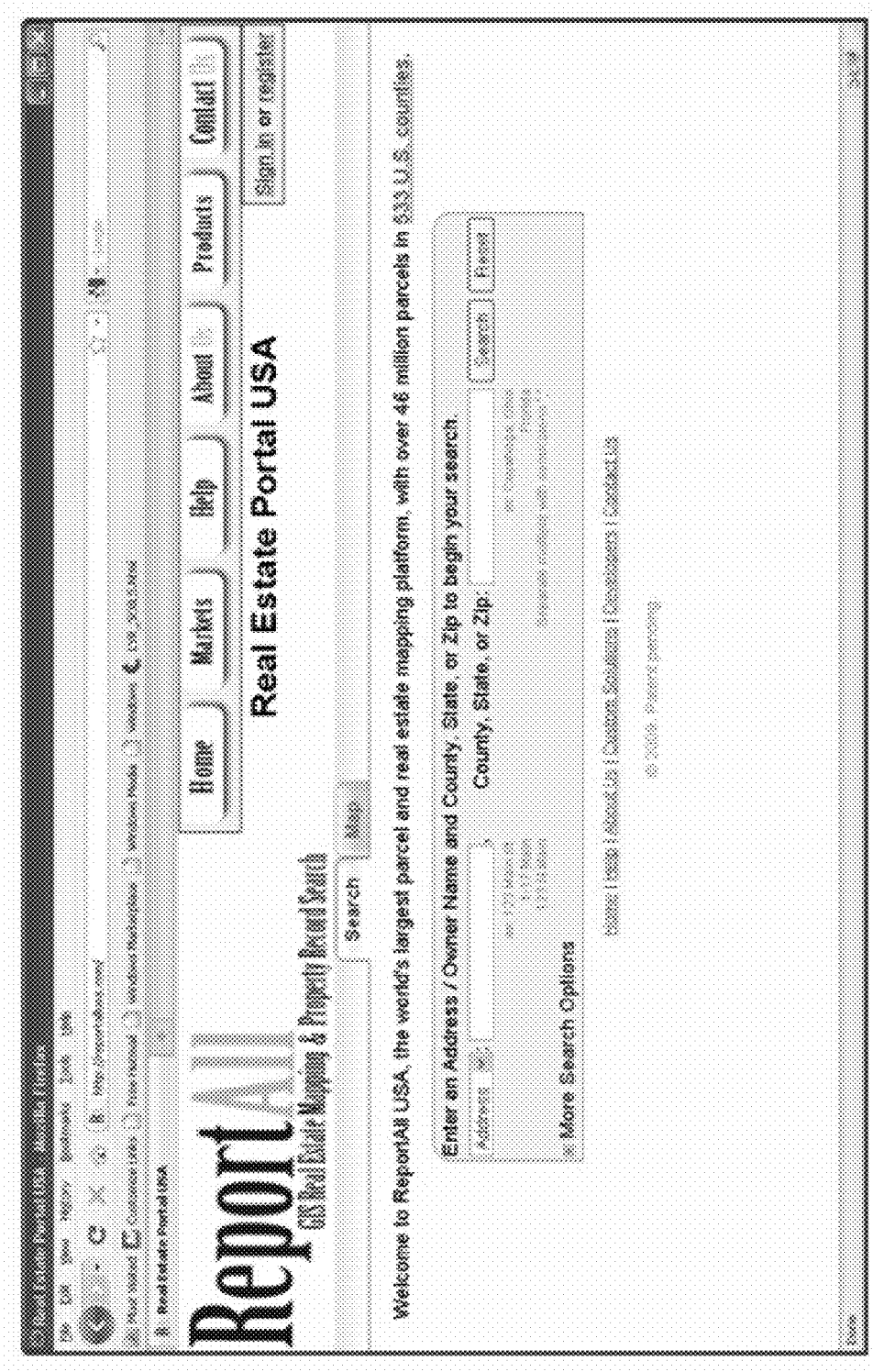
FIG. 2 illustrates an example embodiment of a screen shot of an end-user web page provided by a web site of the web servers of FIG. 1 showing a search view.

FIG. 2 illustrates an example embodiment of a screen shot of an end-user web page provided by a web site of the web servers 160 of FIG. 1 showing a search view 200. FIG. 2 shows the search view 200 of a web page that allows an end-user to enter search parameters to perform a search. Such search parameters include an address, an owner name, a parcel number, a county, a state, and a zip code, in accordance with an embodiment of the present invention. Other search parameters may include a land use code, a sale price, a neighborhood code, a transfer date, a school district, a municipality, a land value, an improvement value, a total market value, a building square-footage, and an acreage. The system 100 having the spatial database(s) supports global searching across artificial boundaries such as across counties and municipalities.

FIG. 3 illustrates an example embodiment of a search results table 300 showing search results for a search performed by an end-user using the search view 200 of FIG. 2. Item 1 shows the addresses in the search result which provide a hyperlink to an internal map capability. Item 2 shows the parcel hyperlinks which link out to an external web site such as, for example, a web site providing county specific auditor data. Item 3 shows data hyperlinks to recorder/GIS records, a tax analyzer tool, and a comparable properties tool. The tax analyzer tool and the comparable properties tool read data from the spatial database of the system 100 and apply an algorithm (see FIG. 12) to transform the data to analysis results data (e.g., tax analysis data or comparable properties data) and find other properties with similarities to a selected property. The tax analyzer tool is based on a square footage and valuation of a property. Item 4 shows a map chooser that lets an end-user select and jump to a variety of external map sources (e.g. Google™ Maps, Bing, Map-Quest). The search results table 300 also shows other information including county, municipality, owner, transfer date, sale price, market value, building square footage, neighborhood (Ngh) code, school district, and land use.

In accordance with an embodiment of the present invention, the system 100 is capable of sending parcel data to a remote site such as, for example, Google™ Maps. Google™ provides an application program interface (API) to use their maps. The system 100 is configured to pass a keyhole markup language (KML) file to the Google™ web site through the API to provide geometric shapes and attribute data (similar to a GIS format) to the non-GIS website. The geometric shapes and attribute data may be overlaid onto Google™ Maps. Google™ Maps cannot be search via an owner (only an address). However, by linking Google™ Maps to the spatial database of the system 100, a search by owner may now be performed by an end-user of the system 100 using Google™ Maps. This is accomplished by searching for, for example, an owner (or parcel ID, etc.) within the spatial database of the system 100, associating the owner (or parcel ID, etc.) with an address, and linking to Google™ Maps.

Figure 4:
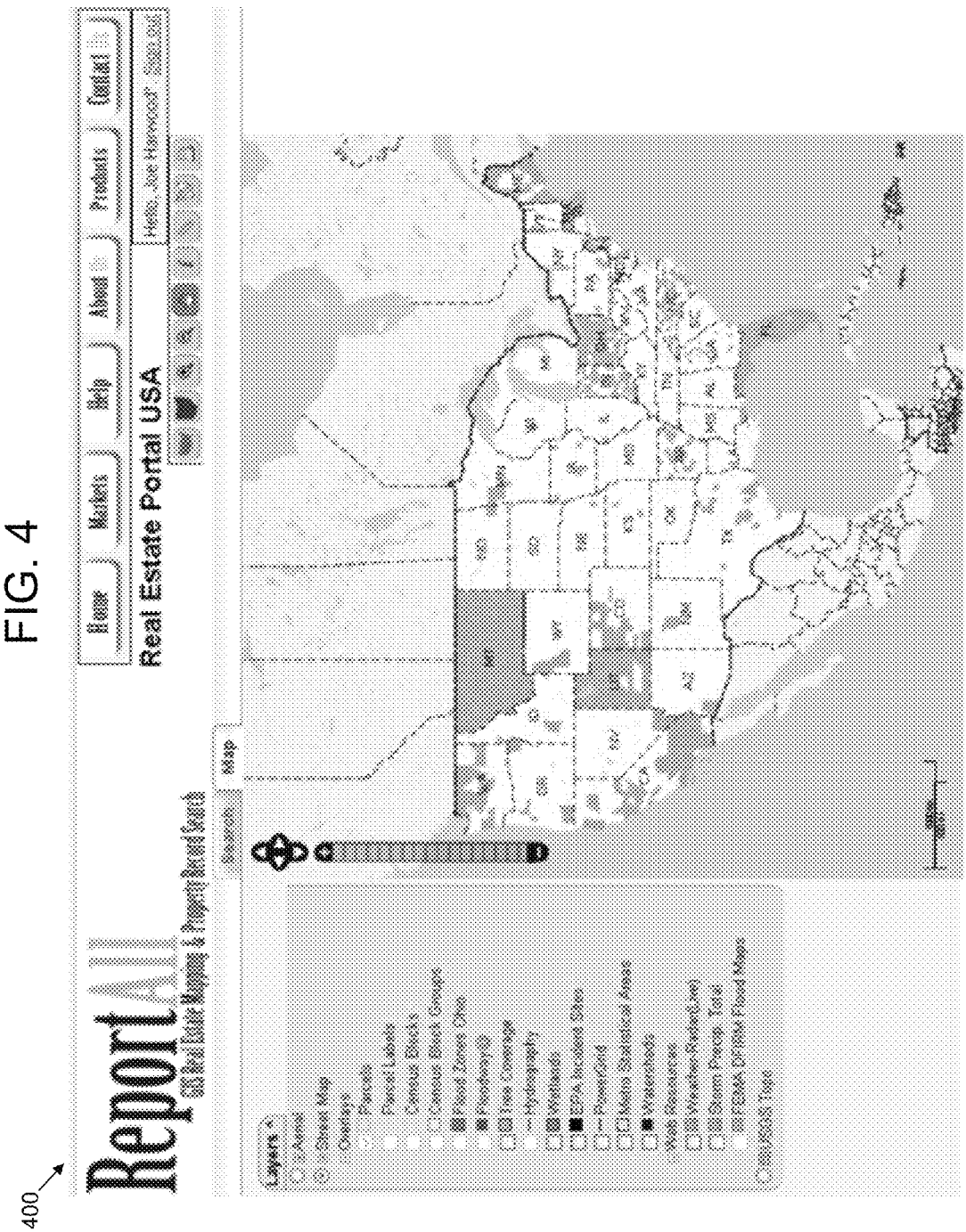
FIG. 4 illustrates an example embodiment of a screen shot of an end-user web page provided by a web site of the web servers of FIG. 1 showing a map view.

FIG. 4 illustrates an example embodiment of a screen shot of an end-user web page provided by a web site of the web servers 160 of FIG. 1 showing a map view 400. The map view 400 allows an end-user to select or zoom in on a particular area of the country (e.g., the United States) and select and view land parcel boundaries as well as other features (e.g., watersheds, tree coverage, flood zones, power grids, etc.) overlaid on the map.

Figure 5:
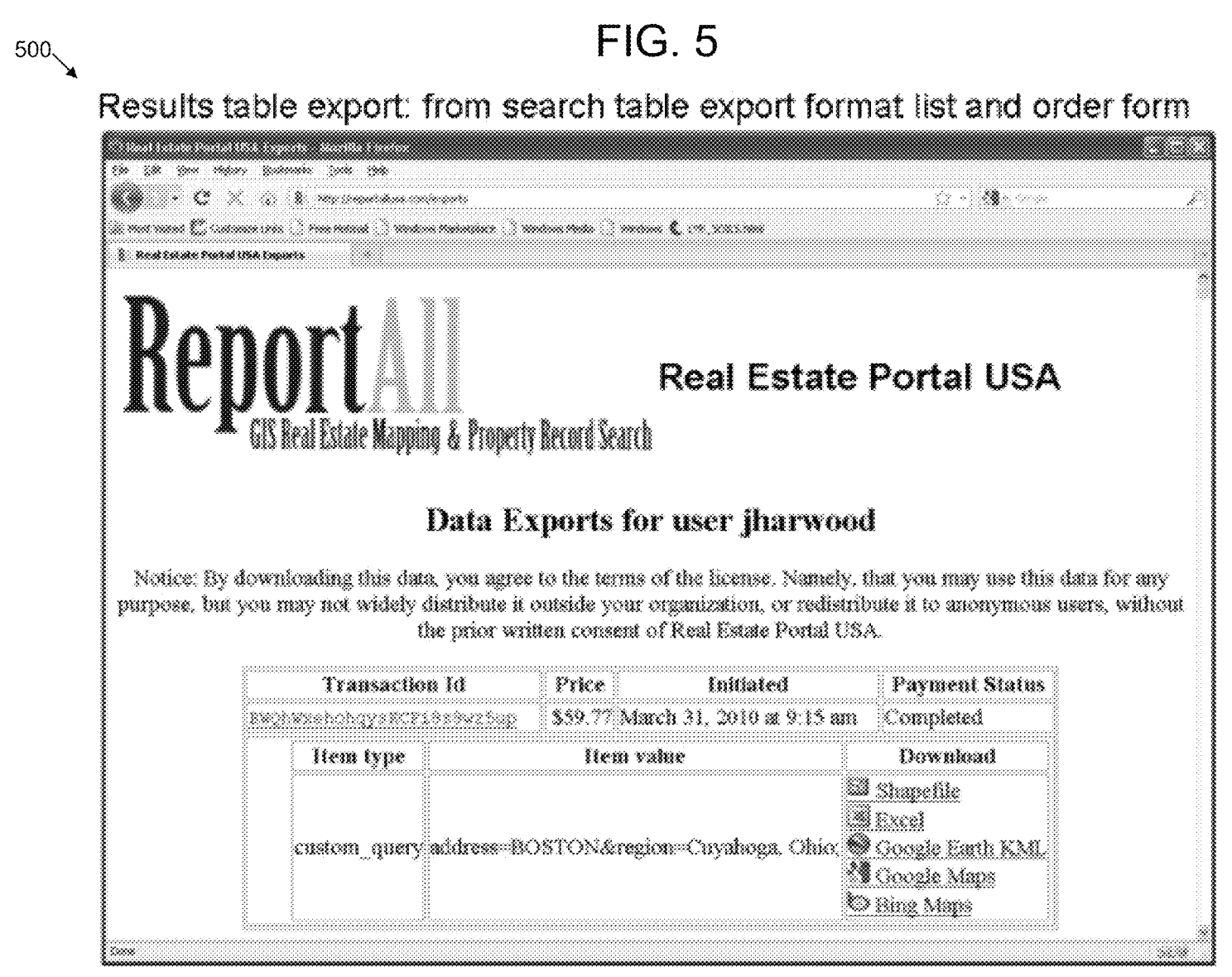

FIG. 5 illustrates an example embodiment of a screen shot of an end-user web page provided by a web site of the web servers 160 of FIG. 1 showing a data export view 500. In general, the system 100 allows an end-user, after having performed a search, to select which data to purchase and download. The selected data may be organized and provided into any of a number of various formats including a GIS shapefile and an Exel® spreadsheet file, in accordance with an embodiment of the present invention. The system 100 allows for an end-user to purchase data via a credit card or a pre-funded account, for example. Alternatively, an end-user may be a member of or subscriber to the website of the system 100 and pay a membership or subscription fee in order to have access to data.

Figure 6:
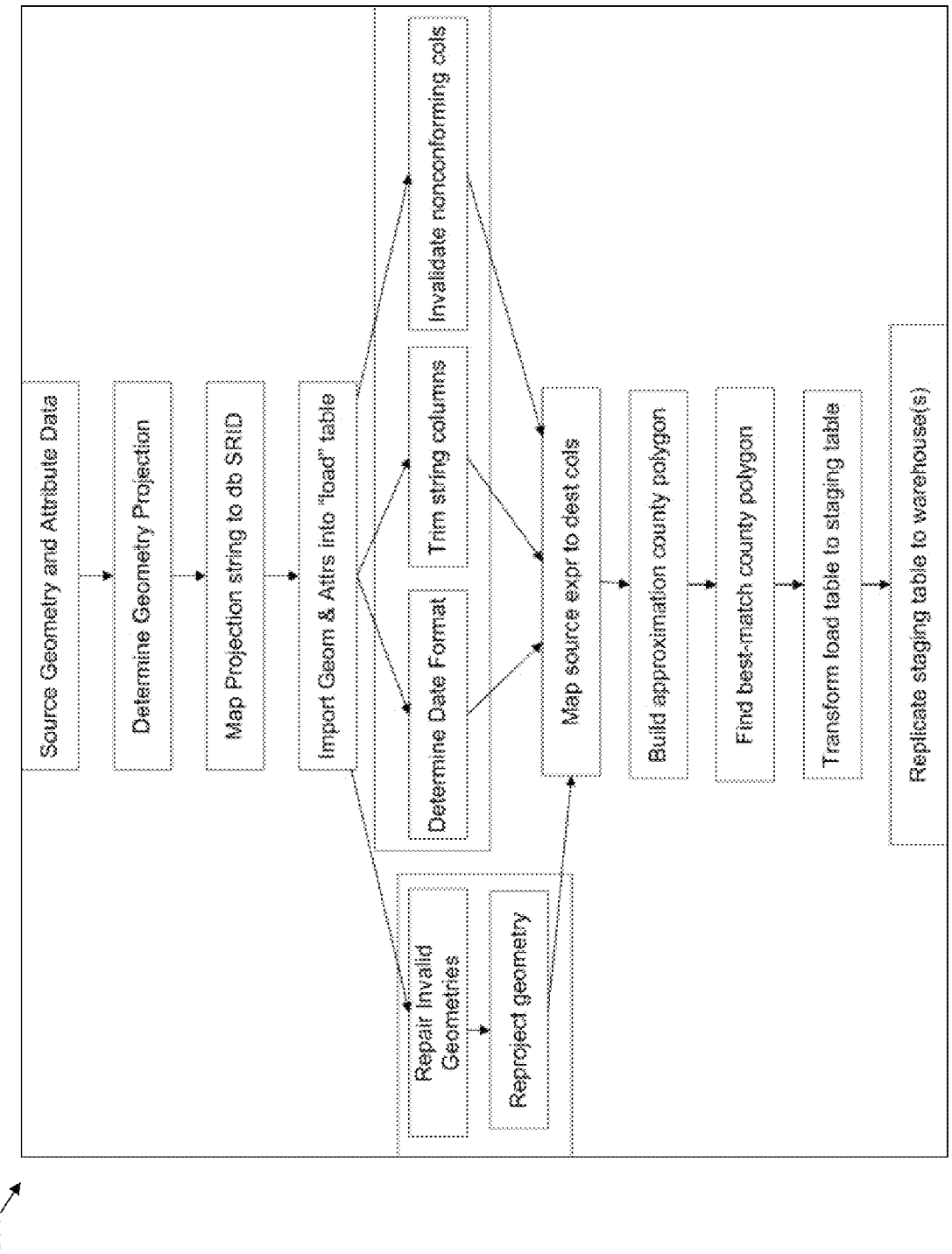
FIG. 6 illustrates a flow diagram of an example embodiment of a data import process of the system of FIG. 1.

FIG. 6 illustrates a flow diagram of an example embodiment of a data import process 600 of the system 100 of FIG. 1. FIG. 6 shows the process of importing data from source files, into the data warehouse (i.e., spatial database(s)). Source geometry and attribute data are identified. This data may reside in files, in a standard format for GIS data, such as an ESRI shapefile or a MapInfo TAB file. The data includes a set of records, each associated with a parcel polygon geometry (possibly NULL), and one or more textual, numeric, or data-typed attributes.

The projection of the source data's geometry is determined. This information may be embedded in the source files as metadata. If projection information is not embedded, but the county is known, then the common projection for this county may be identified from a lookup table.

The projection from the previous step may be mapped to a Spatial Reference System Id (SRID). Spatial databases commonly use SRIDs to succinctly track the projection of their geometries. If the projection does not match a known SRID, then a new SRID may be created for it, associated with the supplied projection information.

Geometry and Attributes may be loaded from the data files into a non-permanent load table in a spatial database. Invalid geometry data is repaired or, if geometry data is too severely mangled to be repaired, it is replaced with a NULL (empty) entry. Attribute data is cleaned. Common operations include trimming excessively long columns, rejecting columns with invalid data for the destination data type, and determining the date format (YYYYMMDD or MMDDYYYY, or . . . ), by examining the data in each column.

Expressions of the source data is mapped to destination columns in the spatial database. Often, a source expression will be a single column, but in general, a source expression may be any transformation (e.g., concatenation of several fields) of data from a record.

If the county is not known, an approximation of the county's polygon may be constructed from the parcel data. The approximation may be generated by applying a geometric union (range) operation, or by a rougher approximation such as convex hull. The approximated county polygon may be checked against county polygons in the same area, and the best-matching county polygon may be chosen. This determines the data's county.

The load table is transformed into a staging table whose schemas match the schema of the tables in the data warehouse. Transformations such as geometry reprojection and address parsing occur at this stage. The staging table is replicated to one or more data warehouses.

Figure 7:
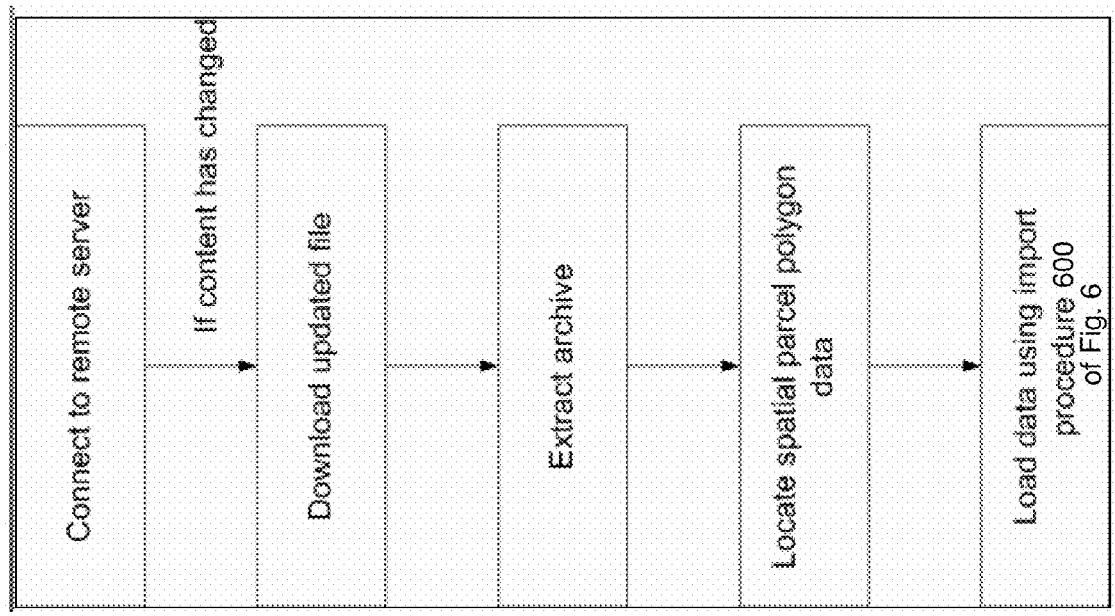
FIG. 7 illustrates a flow diagram of an example embodiment of a parcel auto-update process by which content on the site is automatically updated on a scheduled interval.

FIG. 7 illustrates a flow diagram of an example embodiment of a parcel auto-update process 700 by which content on the site is automatically updated on a scheduled interval. A list of URLs, which point to archives of parcel data on remote servers, is maintained. The procedure is invoked for each URL. The spatial database of the system 100 is configured to know where the county websites are located, or where the relevant data is located, via a web URL or FTP (file transfer protocol). The system 100 is capable of using the URL or FTP information to go out and check for updates (i.e., look for things that have changed) using an auto-updating script. The system 100 checks for changes and loads the changes as updates into the spatial database.

The process 700 connects to the remote server and identifies preliminary information about the archive file. This may include any of file size, date modified, Etag, or other server-supplied information about the file. If this information has changed since the last load of this data, then the process continues. Otherwise, it proceeds with the next URL, starting over.

The updated file is downloaded to a temporary location. The archive is extracted. Since the archive may contain many files, the archive file(s) which contain the parcel polygons are identified from among the archive's contents. This involves inspecting each spatial data file, eliminating files which contain only non-polygon data, etc. The import procedure, described above, is invoked on the spatial data file located in the previous step, loading the data into the spatial database.

Figure 8:
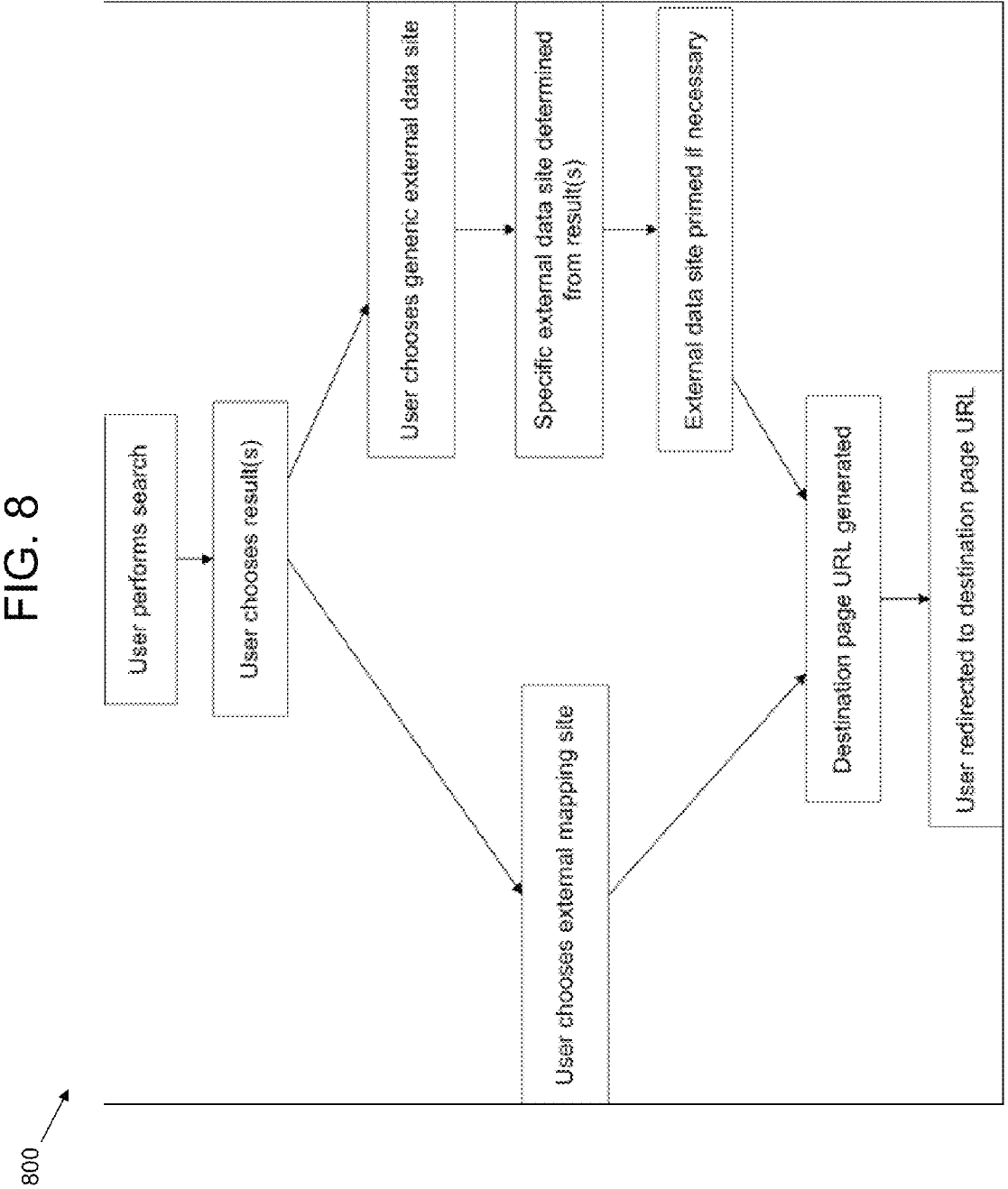
FIG. 8 illustrates a flow diagram of an example embodiment of a user interaction process which is the process by which a user links directly from data records on the web site to other remote sites which contain other information about those records.

FIG. 8 illustrates a flow diagram of an example embodiment of a user interaction process 800 which is the process by which a user links directly from data records on the web site to other remote sites which contain other information about those records. The user performs a search, either by attribute or by spatial location. Results of the search are displayed. The user identifies one or more results for further study.

The user identifies an external site which provides more information about the data. The external site may display a map of the area of the selected results or, the external site may display attribute data about the selected results. The user may have selected a generic external site (e.g., "County Data"), in which case, specific external site information will be retrieved from a lookup table, based on some attribute of the selected record(s) (e.g., county_id).

External site information may include but is not limited to:
Base URL: The base URL of the destination page on the remote site;
Query String Pairs of field names and corresponding field values, to be submitted to the remote site;
Session id or cookie URL: A URL to be visited prior to visiting the remote destination page, from which a session id value or cookie value should be extracted for later submission to the destination page;
Both of:
Intermediate URL: A URL to be visited prior to visiting the destination page, which contains information on how the user should be later directed to the destination page. This is commonly an intermediate, "search results" page, from which the link to the destination page can be extracted.
Intermediate expression: An extraction expression or function. When applied to the content retrieved from the above intermediate URL, the expression returns some information. This extracted information is used to direct the user to the destination page. In the above example, extracted information is commonly the URL pointed to by the search results page.
The remote site is "primed", if necessary. Certain sites may need to be "primed" before the user visits them. Other sites need no priming at all, in which case this step may be skipped. Possible priming actions, which can occur either on the server, on the client, or both, include:
make a request to the remote site to obtain a session id, for the user to use in a subsequent request;
make a request to the remote site to obtain a cookie, for the user to use in a subsequent request;
make a request to the remote site to obtain an intermediate page. Parse the intermediate page, extracting some information. Use that information to construct a URL on a remote site.
A URL is constructed from any or all of the following sources:
known information about the remote site;
information from the selected results;
information gained from the previous priming step.
The user is redirected to the URL constructed in the previous steps.

Figure 9:
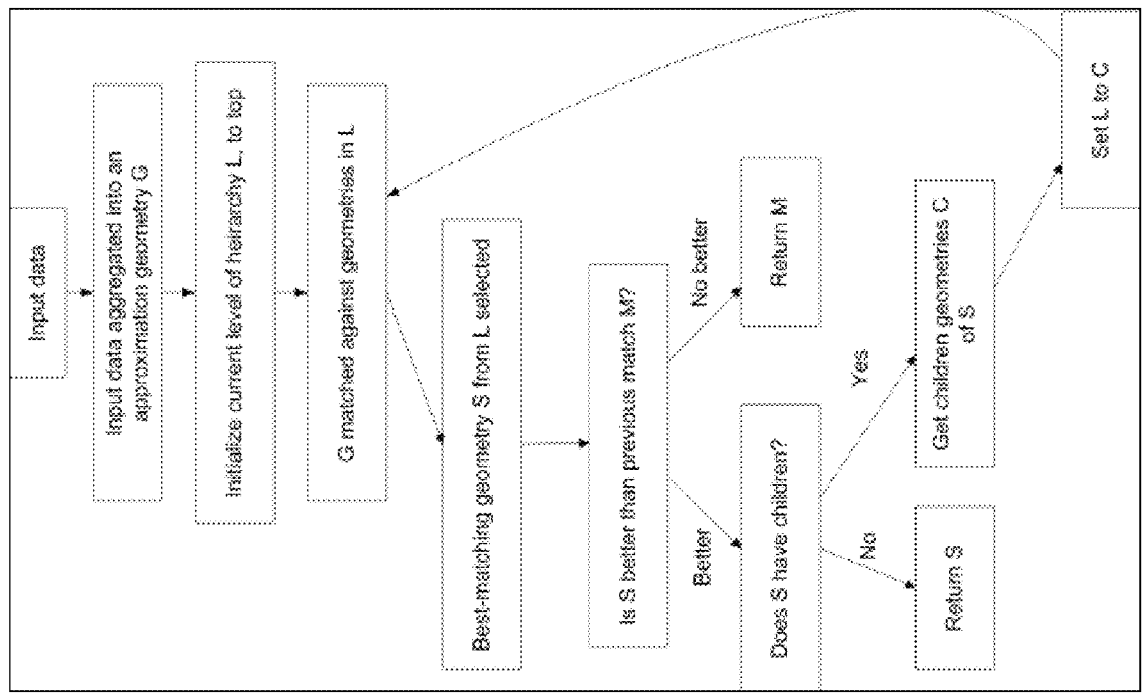
FIG. 9 illustrates a flow diagram of an example embodiment of a hierarchical load process which allows the system to automatically identify whether input data corresponds to a state, a county, or a municipality, etc., and to identify which region it matches.

FIG. 9 illustrates a flow diagram of an example embodiment of a hierarchical load process 900 which allows the system to automatically identify whether input data corresponds to a state, a county, or a municipality, etc., and to identify which region it matches (e.g., the entire state of Ohio, the city of Akron, Ohio).

Real estate parcels are spliced into a spatial database, replacing any older data in their region. The import process requires an established hierarchy of region geometries in the warehouse, to use as a reference, to match the incoming parcels against. Using these as a reference, the closest-match region is identified and, thus, it is known which parcels in the warehouse should be deleted, as they will be replaced with the incoming data.

The input data, a collection of parcel polygon geometries in a roughly contiguous region, is obtained. The input geometries are merged into an aggregate geometry G. This can be a geometric union of the input polygons, or it can be an approximation such as the convex hull.

G is matched against polygons in the current level of the hierarchy. The geometry G is compared against geometries L in the current level of the hierarchy, to determine which geometry S in L, best matches G. The determination of "best match" can be by some geometric comparison method like maximal intersection of area. If S is no better than the previous match M, then return M as the correct region for the input data.

If S has children regions (e.g., a state has "children" county regions, and a county has "children" municipality regions), get the geometries C of the children regions. If S has no children regions, then return S as the correct region for the input data. The latter case will occur, for instance, when a certain municipality is the best match, and that municipality has not been divided into any sub-regions.

Set the current level of the hierarchy to the children regions, C, then recurse to the matching step. When the procedure returns the correct region R, the spatial database is updated by the following process:
begin a transaction;
delete existing data in the identified region;
insert the input data;
commit the transaction.

The transactional update prevents other users of the spatial database from seeing temporarily inconsistent data while the delete and insert operations are being performed.

Figure 10:
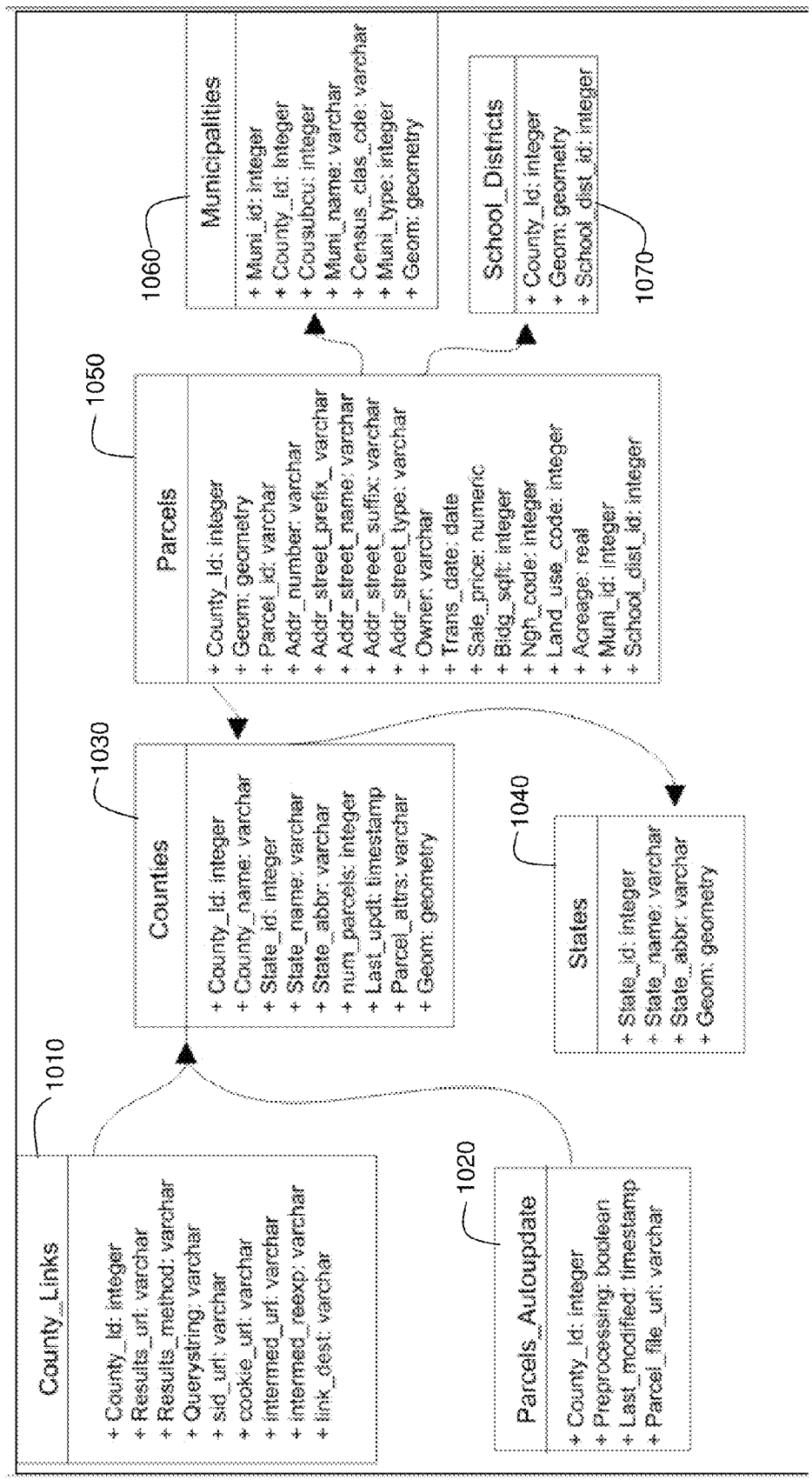
FIG. 10 illustrates a diagram of an example embodiment of a database schema used in the system of FIG. 1.

FIG. 10 illustrates a diagram of an example embodiment of a database schema 1000 used in the system 100 of FIG. 1. The database schema 1000 includes a plurality of tables that exist within the spatial database(s) of the system 100 of FIG. 1. Each table includes records of particular types of data. Based on geometry, counties make up states, municipalities make up counties, and school districts tend to make up municipalities but, however, can cross over between municipalities. The tables making up the database schema 1000 are a county links table 1010, a parcels auto-update table 1020, a counties table 1030, a states table 1040, a parcels table 1050, a municipalities table 1060, and a school districts table 1070, in accordance with an embodiment of the present invention.

In accordance with an embodiment of the present invention, the parcels table schema includes a plurality of attributes including county (county FIPS code), parcel id (county specific formatted ID), geometry (polygon geometry), address (site address), owner (deeded owner(s)), transfer date (date of last property transaction), sale price (price associated with transfer date), building sq. ft. (living area), neighborhood code (county specific code, descriptive of like, local properties), land use code (code classifying property use 100-999), acreage (deeded acreage (not computational)), market value land (value of land), market value building (value of building(s) on parcel), market value total (sum of land and building values), municipality (name of underlying municipality or township), school district (code indicating underlying taxing school district), zip code (zip code), load table ID (for looking up county-specific attributes from load table), book, page, auditor link (hyperlink to parcel's county auditor record).

Each parcel record may further include a flexible data structure which stores extended, less common attributes such as, for example, CAUV (current agricultural use value), foreclosure (foreclosure/forfeiture information), state owned score (probability that parcel is state owned based on aggregate score of hints when uncertain), managing agency (for state owned properties, the known or guessed managing agency), recorder/GIS links (hyperlinks to other county records, where available).

The arrows in FIG. 10 indicate how the tables share members and how the tables are integrated with each other and reference each other. In general, based on a particular selected parcel, the shared values between the various tables allow attributes to be looked up from the various tables which each have different geometries or spatial references in order to pull references back into a user query. For example, by selecting a particular parcel, access to all of the attribute records in the parcel table 1050 is established as well as the records in the other various tables related to that parcel via the shared values between the tables.

All of the attributes that are stored in the parcels table 1050 per record include a county_id integer field which is common to the parcels table 1050 and the counties table 1030. Each parcel record includes a county_id and the counties table 1030 includes a county_id, a county_name, and a state_id integer. The state_id integer is shared between the counties table 1030 and the states table 1040. The states table 1040 includes a state name, a state abbreviation, and a geometry. Furthermore, the municipalities table 1060 is referenced from the parcels table 1050 via the muni_id integer and includes its own attributes. The school districts table 1070 is referenced from the parcels table 1050 via the school_dist_id integer and includes its own attributes.

The counties table 1030 links the parcels table 1050 to the county links table 1010 via the county_id integer. The county links table 1010 is the table that lets the end-user select a parcel ID number that then automatically creates a web URL that dynamically links the end-user to a specific county record. Therefore, the spatial database is going from a particular parcel number in the parcels table 1050 that patches through the county_id integer which is then passed on to the county links table 1010. The established county_id link tells the counties table 1030, using a particular URL and a particular method and particular intermediate characters, to pass information back to the user's query which will supply the information along with the actual parcel ID number which will then cause a dynamic session to be created within the user's experience such that a particular parcel record is brought up on a display screen from a particular auditor's web site of that county.

The parcels auto-update table 1020 interfaces to the counties table 1030 via the county_id integer and specifies the set of records within the counties table 1030 that then specifies all the parcels within the parcels table 1050 with that unique county_id integer. If a county record gets updated, the county_id integer within the parcels table 1050 is the value that is searched upon to then update the records. In general, when an auto-update takes place, all records are addressed during the update. When a new data set is acquired from a county, the parcel auto-updating scripts (see FIG. 1) downloads the URL defining the location of the data required for updating and tells the loading scripts (see FIG. 1) the county_id that was just downloaded and then proceeds to pass through the counties table 1030 back to the parcels table 1050 which has the shared value of county_id integer. Then, for that county_id integer, the corresponding records are selected and dropped from the parcels table 1050 using a SQL command. As the loading scripts are running as part of the auto-update process, the new values are loaded into the parcels table 1050 and the values are verified, checked, and standardized to make sure there are no errors in the data.

Figure 11:
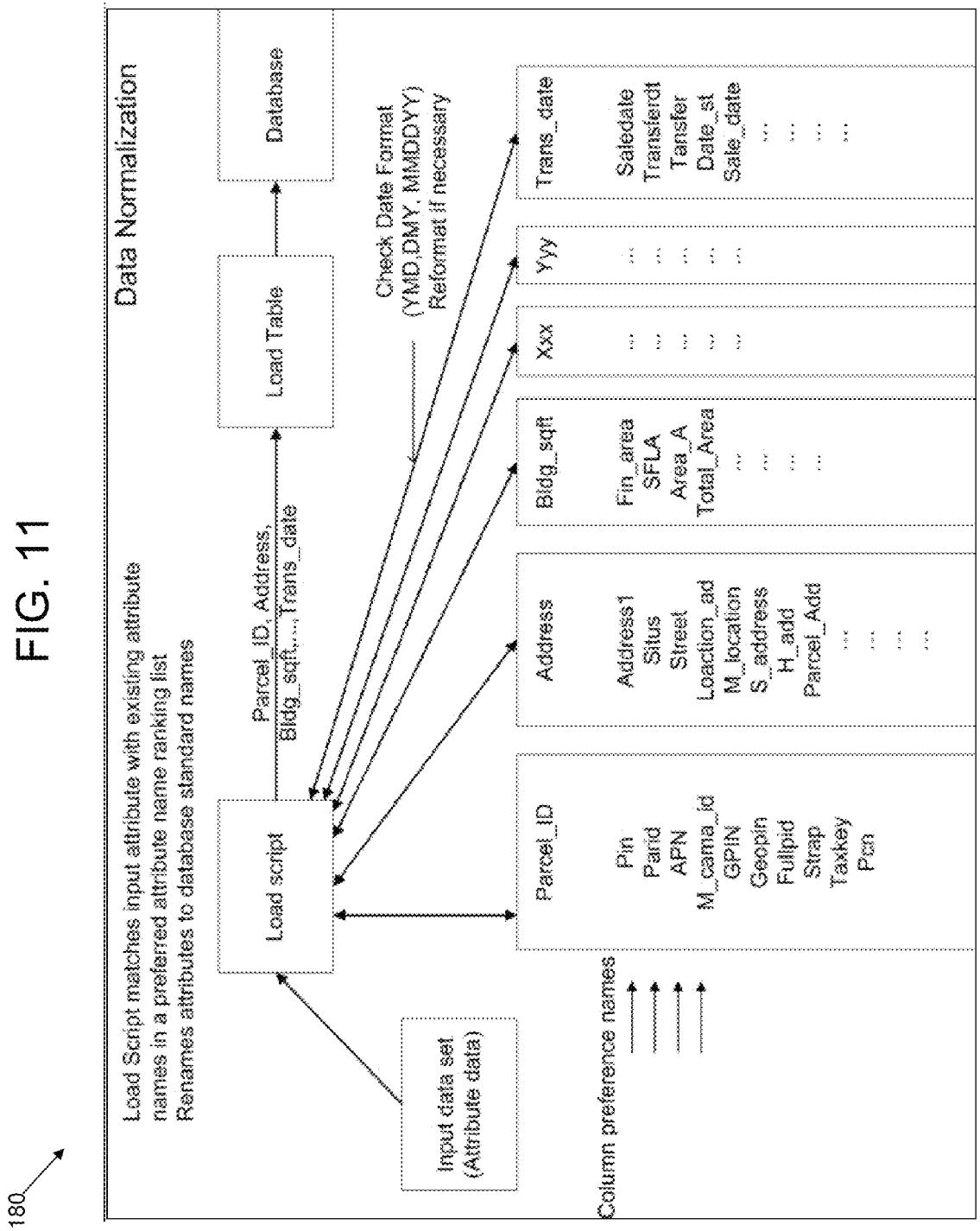
FIG. 11 illustrates a diagram of an example embodiment of a data normalization or standardization process performed by the system of FIG. 1.

FIG. 11 illustrates a diagram of an example embodiment of a data normalization or standardization process 180 performed by the system of FIG. 1. The process 180 is performed whenever new data is acquired for the spatial database or whenever data is to be updated for the spatial database. Initially, for example, county data may be obtained via a web down load or via a CD. The data may be transformed to an intermediate format and multiple pieces of data may be joined together by the system 100.

The spatial database of the system 100 stores a normalized version of each source record in a larger searchable database, allowing searches and analysis on inter-county records which were previously separate and incomparable. During a load process, shapefile geometry is repaired if erroneous, and relevant source fields are mapped to destination fields in the normalized table. The mapping is automatically derived, allowing data loads with no human intervention. The normalized records are spliced into the spatial database of the system 100, replacing old data, with no inconsistency or downtime.

The column headers of Parcel_ID, Address, Bldg_sqft, Xxx, Yyy, and Trans_date in FIG. 11 refer to the standardized or normalized fields or naming conventions within the spatial database of the system 100. All of the instances or variations (non-standard names or fields) of a particular standardized field are listed below the column header of each column, where the instances and variations are from all of the disparate sources of information used by the system 100. For example, each county may have a different non-standard naming convention for the various standardized fields. Therefore, any particular input data set may include a mixture or combination of any of these non-standard names. The load script identifies the non-standard names and associates the non-standard names with a standardized name or field within the spatial database of the system 100.

The load table examines each record before it is loaded into the spatial database of the system 100 and transforms the input data set by assigning additional associated information such as zip codes and school district ID's, for example, and repairing invalid geometries (i.e., performs value-added operations). Once the load table data transformation is complete, the load table data is loaded into the spatial database of the system 100. Refer to the data import process of FIG. 6 for more detail.

As stated previously herein, a comparables search tool is provided which not only returns parcels comparable to a selected parcel, but also ranks results by similarity. A tax analysis tool is provided which not only returns parcels comparable to a selected parcel, but also ranks results by similarity to the selected parcel, summarizes tax valuation information of the top (most similar) results, and tells the user how the selected parcel's tax valuation compares with the results.

Figure 12:
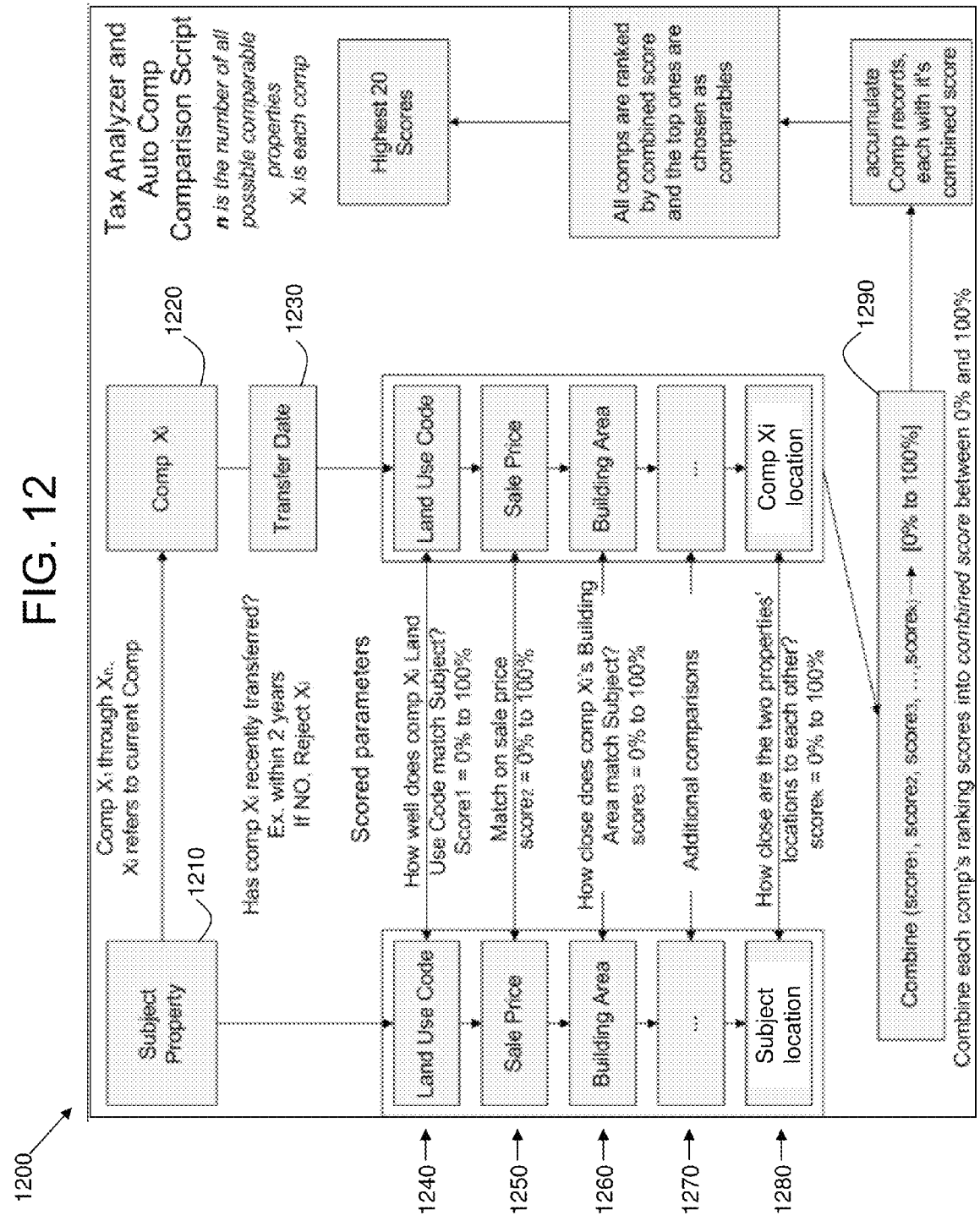
FIG. 12 illustrates a diagram of an example embodiment of an auto-comparables methodology for tax analysis and property comparison purposes.

FIG. 12 illustrates a diagram of an example embodiment of an auto-comparables methodology 1200 for tax analysis and property comparison purposes. Comparisons are made with respect to a subject parcel or property 1210 of interest, as selected by a user. The subject property is compared to a plurality of possible comparable parcels or properties $X_1$ through $X_n$, comparing to one comparable property $X_i$ 1220 of the plurality of comparable properties at a time. Initially, a determination 1230 is made as to whether or not the current comparable property $X_i$ 1220 recently transferred ownership (e.g., within the last two years). If not, the comparable property $X_i$ is rejected, otherwise the methodology 1200 proceeds to the scored parameters portion of the methodology 1200.

In the scored parameters portion of the methodology 1200, a land use code comparison 1240 is made which determines how well the current comparable property $X_i$ 1220 land use code matches the land use code of the subject property 1210. In accordance with an embodiment of the present invention, a land use code score, being in the range of 0% to 100%, is assigned to the current comparable property $X_i$ 1220 based on the comparison. Next, a sale price comparison 1250 is made which determines how well the current comparable property $X_i$ 1220 sales price matches the sale price of the subject property 1210. In accordance with an embodiment of the present invention, a sale price score, being in the range of 0% to 100%, is assigned to the current comparable property $X_i$ 1220 based on the comparison.

A building area comparison 1260 is then made which determines how well the building area of the current comparable property $X_i$ 1220 matches the building area of the subject property 1210. In accordance with an embodiment of the present invention, a building area score, being in the range of 0% to 100%, is assigned to the current comparable property $X_i$ 1220 based on the comparison. Also, a distance comparison 1280 is made which determines how close the location of the current comparable property $X_i$ 1220 is to the location of the subject property 1210. In accordance with an embodiment of the present invention, a proximity score, being in the range of 0% to 100%, is assigned to the current comparable property $X_i$ 1220 based on the comparison. Similarly, other comparisons 1270 of the subject property 1210 and the current comparable property $X_i$ 1220 may be made and scored. Such comparisons are performed for each of the plurality of possible comparable properties $X_1$ through $X_n$.

The various scores for each comparable property $X_i$ 1220 are combined to form a combined score 1290 being in the range of 0% to 100%, in accordance with an embodiment of the present invention. The comparables records are accumulated for the plurality of possible comparable properties $X_1$ through $X_n$, each with its combined score 1290. The plurality of possible comparable properties $X_1$ through $X_n$, are then ranked by combined score and the top comparable properties are selected as the final set of comparable properties (e.g., the top twenty comparable properties of the plurality of comparable properties $X_1$ through $X_n$, having the highest combined scores) and may be displayed to the end-user.

In summary, systems and methods to search for, gather, transform, integrate, and present information representative of real property and land parcels are disclosed. The systems and methods are web-based and include a spatial database configuration having an input side and an output side. The input side is capable of transforming data gathered from multiple disparate sources in an automated or semi-automated manner. The output side is capable of presenting an intuitive interface for users to search for, access, and view the transformed information. In general, the systems and methods described herein are used at least to: automatically import source information representative of real property and land parcels from a plurality of disparate data sources across a plurality of disparate counties, assessing authorities, taxing authorities, and mapping authorities and being in a plurality of disparate data formats; automatically transform the source information from the plurality of disparate data formats having the source information to a standardized data format having normalized data; automatically store the normalized data in the standardized data format; and perform a global search of the stored normalized data based on any of a plurality of predefined search parameters and combinations thereof to generate search results data.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A networked computer system to search for, gather, transform, integrate, and present information representative of real property and land parcels, said networked computer system comprising:
   a spatial database architecture of hardware and software configured and programmed to:
      automatically import source information representative of real property and land parcels from a plurality of disparate data sources across a plurality of disparate counties, assessing authorities, taxing authorities, and mapping authorities and being in a plurality of disparate data formats,
      automatically transform said source information from said plurality of disparate data formats having said source information to a standardized data format having normalized data,
      automatically store said normalized data in said standardized data format,
      perform a global search of said stored normalized data based on any of a plurality of predefined search parameters and combinations thereof to generate search results data; and
   at least one web server operationally interfacing to said spatial database architecture and being configured and programmed to provide access to and real-time interaction with said spatial database architecture by an end-user.

2. The networked computer system of claim 1 wherein said spatial database architecture is further configured and programmed to export at least a portion of said search results data as selected by said end-user via said at least one web server.

3. The networked computer system of claim 1 wherein said at least one web server is further configured and programmed to transform at least a portion of said search results data to map image data.

4. The networked computer system of claim 1 wherein said at least one web server is further configured and programmed to direct said end-user towards at least one external web site to access external data associated with said search results data.

5. The networked computer system of claim 4 wherein said external data includes at least one of county auditor/assessor data and county recorder data.

6. The networked computer system of claim 4 wherein said spatial database architecture is further configured and programmed to analyze and transform at least one of said search results data and said external data to form analysis results data.

7. The networked computer system of claim 6 wherein said spatial database architecture is further configured and programmed to export at least a portion of said analysis results data as selected by said end-user via said at least one web server.

8. The networked computer system of claim 6 wherein said analysis results data include at least one of tax analysis data and comparable properties data.

9. The networked computer system of claim 6 further comprising at least one end-user computer device operationally interfacing to said at least one web server and configured and programmed to receive and display user interface screens, map image data, said search results data, said external data, and said analysis results data.

10. The networked computer system of claim 1 wherein said spatial database architecture and said at least one web server are further configured and programmed to direct said end-user towards at least one external map web site and to integrate at least a portion of said search results data with at least one map of said at least one external map web site.

11. The networked computer system of claim 1 wherein said plurality of predefined search parameters include at least a parcel identification number and a deeded owner name.

12. The networked computer system of claim 1 wherein said plurality of predefined search parameters include at least one of a land use code, a sale price, an address, a neighborhood code, a transfer date, a school district, a zip code, a municipality, a land value, an improvement value, a total market value, a building square-footage, and an acreage.

13. The networked computer system of claim 1 wherein said access to and real-time interaction with said spatial database architecture is via at least one of a web site hosted on said at least one web server and a web server application supported by said at least one web server.

14. A networked computer system to search for, gather, transform, integrate, and present information representative of real property and land parcels, said networked computer system comprising:
   a spatial database architecture of hardware and software comprising:
      means for automatically importing source information representative of real property and land parcels from a plurality of disparate data sources across a plurality of disparate counties, assessing authorities, taxing authorities, and mapping authorities and being in a plurality of disparate data formats,
      means for automatically transforming said source information from said plurality of disparate data formats having said source information to a standardized data format having normalized data,
      means for automatically storing said normalized data in said standardized data format, and
      means for performing an end-user directed global search of said stored normalized data based on any of a plurality of predefined search parameters and combinations thereof to generate search results data; and
   at least one web server comprising:
      means for operationally interfacing to said spatial database architecture, and
      means for providing access to and real-time interaction with said spatial database architecture by an end-user.

15. The networked computer system of claim 14 further comprising means for providing access to and real-time interaction with said means for performing a global search by an end-user.

16. The networked computer system of claim 14 further comprising means for transforming at least a portion of said search results data to map image data.

17. The networked computer system of claim 14 further comprising means for exporting at least a portion of said search results data as selected by said end-user.

18. The networked computer system of claim 14 further comprising means for directing said end-user towards at least one external web site to access external data associated with said search results data.

19. The networked computer system of claim 18 wherein said external data includes at least one of county auditor/assessor data and county recorder data.

20. The networked computer system of claim 18 further comprising means for analyzing and transforming at least one of said search results data and said external data to form analysis results data.

21. The networked computer system of claim 20 further comprising means for exporting at least a portion of said analysis results data as selected by an end-user.

22. The networked computer system of claim 20 wherein said analysis results data include at least one of tax analysis data and comparable properties data.

23. The networked computer system of claim 20 further comprising means for displaying user interface screens, map image data, said search results data, said external data, and said analysis results data.

24. The networked computer system of claim 14 further comprising means for directing said end-user towards at least one external map web site and integrating at least a portion of said search results data with at least one map of said at least one external map web site.

25. The networked computer system of claim 14 wherein said plurality of predefined search parameters include at least a parcel identification number and a deeded owner name.

26. The networked computer system of claim 14 wherein said plurality of predefined search parameters include at least one of a land use code, a sale price, an address, a neighborhood code, a transfer date, a school district, a zip code, a municipality, a land value, an improvement value, a total market value, a building square-footage, and an acreage.

27. A computerized method to search for, gather, transform, integrate, and present information representative of real property and land parcels, said method comprising:
   using a spatial database architecture of hardware and software to:
      automatically import source information representative of real property and land parcels from a plurality of disparate data sources across a plurality of disparate counties, assessing authorities, taxing authorities, and mapping authorities and being in a plurality of disparate data formats;
      automatically transform said source information from said plurality of disparate data formats having said source information to a standardized data format having normalized data;
      automatically store said normalized data in said standardized data format; and
      perform an end-user initiated global search of said stored normalized data based on any of a plurality of prefined search parameters and combinations thereof to generate search results data; and
   using at least one web server to:
      operationally interface to said spatial database architecture, and
      provide access to and real-time interaction with said spatial database architecture by an end-user.

28. The method of claim 27 further comprising transforming at least a portion of said search results data to map image data.

29. The method of claim 27 further comprising exporting at least a portion of said search results data as selected by an end-user.

30. The method of claim 27 further comprising directing said end-user towards at least one external web site to access external data associated with said search results data.

31. The method of claim 30 wherein said external data includes at least one of county auditor/assessor data and county recorder data.

32. The method of claim 30 further comprising analyzing and transforming at least one of said search results data and said external data to form analysis results data.

33. The method of claim 32 further comprising exporting at least a portion of said analysis results data as selected by an end-user.

34. The method of claim 32 wherein said analysis results data include at least one of tax analysis data and comparable properties data.

35. The method of claim 27 further comprising directing said end-user towards at least one external map web site and integrating at least a portion of said search results data with at least one map of said at least one external map web site.

36. The method of claim 32 further comprising displaying at least one of user interface screens, map image data, said search results data, said external data, and said analysis results data.

37. The method of claim 27 wherein said plurality of predefined search parameters include at least a parcel identification number and a deeded owner name.

38. The method of claim 27 wherein said plurality of predefined search parameters include at least one of a land use code, a sale price, an address, a neighborhood code, a transfer date, a school district, a zip code, a municipality, a land value, an improvement value, a total market value, a building square-footage, and an acreage.

* * * * *